United States Patent [19]

Cholley et al.

[11] Patent Number: 4,521,072
[45] Date of Patent: Jun. 4, 1985

[54] OPTICAL CABLE DESIGNED TO WITHSTAND HIGH PRESSURES

[75] Inventors: Henri E. Cholley, Lamorlaye; Jean J. Laupretre, Rochy Conde; Jean Rollet, Paris, all of France

[73] Assignee: Foptica, Sainte Genevieve, France

[21] Appl. No.: 392,685

[22] Filed: Jun. 28, 1982

[30] Foreign Application Priority Data

Aug. 5, 1981 [FR] France ................ 81 15218

[51] Int. Cl.³ .................................. G02B 5/14
[52] U.S. Cl. .................................. 350/96.23
[58] Field of Search ........................ 350/96.23

[56] References Cited

U.S. PATENT DOCUMENTS 4,147,406 4/1979 Anderson ............. 350/96.23
4,389,088 6/1983 Trezequet ............. 350/96.23

Primary Examiner—William L. Sikes
Assistant Examiner—Robert E. Wise
Attorney, Agent, or Firm—Mason, Kolehmainen, Rathburn & Wyss

[57] ABSTRACT

The invention relates to an optical cable designed to withstand high pressures and made up of at least one elementary cable comprising optical fibres disposed in a circular cylindrical support and surrounded by at least one wound strip giving more than 100% overlap, the strip being in turn surrounded by a sealing-tight sheath and the elementary cable or cables being in turn surrounded by bearing means, mechanical protection means and electric conducting means.

13 Claims, 10 Drawing Figures

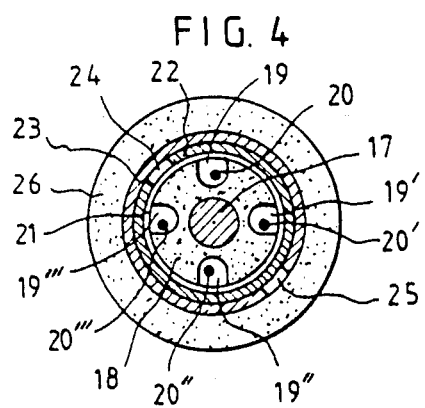
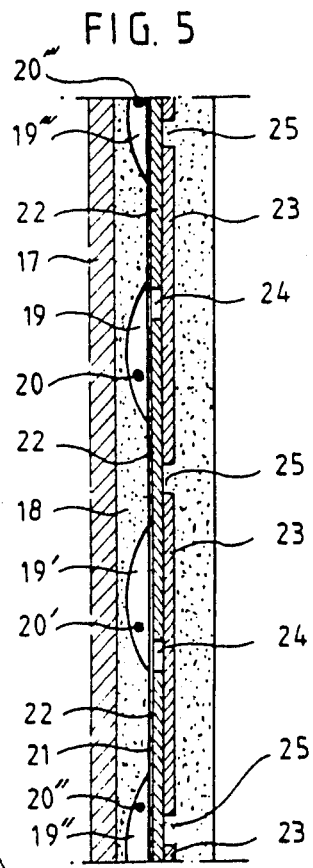
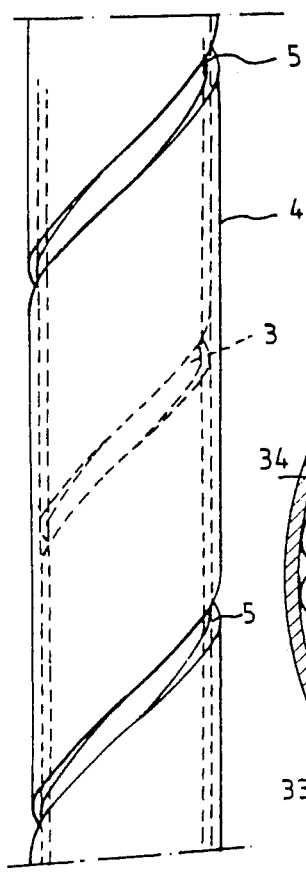
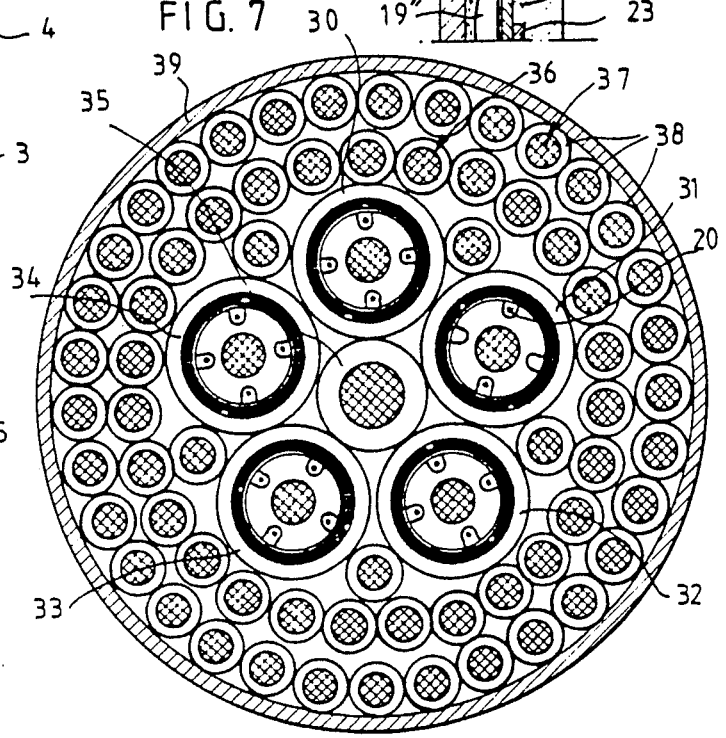

OPTICAL CABLE DESIGNED TO WITHSTAND HIGH PRESSURES

The invention relates to an optical cable adapted inter alia to withstand high pressures combined if necessary with other hostile environmental factors.

Optical fibres have extremely advantageous characteristics which have facilitated the development of optical-fibre cables for transmitting telephone signals, digital video signals, etc. Usually, optical-fibre cables of the aforementioned kind are buried in the ground like conventional cables. Such cables present special problems owing to the special nature of optical fibres, but the problems are not insurmountable.

In other applications the problems are more difficult. For example, it would be advantageous to use optical-fibre cables for transmitting digital video signals between under-water scanning or monitoring cameras and signal-processing systems (video screens, recording devices etc) on under-water prospecting ships for finding polymetallic nodules or working oil wells at sea, etc.

Under the aforementioned operating conditions, the optical-fibre cable is vertically immersed and bears a load such as television cameras, projectors, means for moving the projectors, and television sets, and the cable also comprises electric conductors for supplying the apparatus.

Under these conditions the cable must meet the following requirements. It must:

be protected against corrosion, be able to withstand its own weight and also that of the loads, comprise electric conductors for supplying the apparatus at the end of the cable, protect the optical fibres against all pressure stresses capable of seriously affecting the optical transmission characteristics and be sufficiently flexible to be wound.

Optical-fibre cables known at present are of two kinds—captive-fibre cables and free-fibre cables. The fibres are usually B 50/125 optical fibres, i.e. the optical fibre has a core diameter of 50 microns and a sheath (or cladding) diameter of 125 microns.

Captive-fibre cables are made up of a number of fibres each surrounded by a protective material, the thus-embedded fibres being connected by a connecting material so as to form a single core. The embedded fibres can move to a certain extent inside the core. The cable assembly has external taping.

The second kind of cables, i.e. with free fibres, are made up of a core having a central member, the core having peripheral cavities in the form of helical grooves having a cross-section much larger than that of the optical fibres. An optical fibre is placed in each cavity and left free, i.e. so that the length of the fibre is slightly greater than the length of the cavity. When the cable is subjected to tensile forces, therefore, the forces are not transmitted (within certain limits) to the fibres.

Both kinds of cables have advantages and disadvantages. The first kind of cable has the advantage of being easier to manufacture than the second cable.

The second kind of cable is advantageous because of its low bulk and excellent characteristics, particularly when it is not used or positioned like an ordinary cable but is used as a movable cable or is adapted to withstand tensile or compressive or temperature stresses.

The object of the invention is to provide a low-weight optical transmission cable which is not only self-supporting but can also bear a load, the cable being flexible and adapted to operate at high pressures and having a relatively high number of optical fibres for transmitting a large amount of information over relatively long distances.

To this end, the invention relates to a flexible optical cable adapted for operation under pressure, the cable being characterised in that it is made up of at least one elementary cable comprising optical fibres disposed in a circular cylindrical support and surrounded by at least one wound strip providing more than 100% overlap, the strip being in turn surrounded by a sealing-tight sheath and the elementary cable or cables being in turn surrounded by bearing means, mechanical protection means and electric conducting means.

According to another feature, the thickness of the wound strip or strips is related to the winding radius by the following formula:

$$Pc = \frac{E}{4(1-\mu^2)}\left(\frac{e}{R}\right)^3$$

in which:

Pc = critical buckling pressure

E = elasticity modulus of the strip material, $\mu$ = Poisson coefficient of the strip material, e = width of strip and R = average radius around which the outermost strip is wound.

In the elementary cable, the wound strip or strips give a total overlap of over 100% and, in combination with the sealing-tight sheath, provide resistance to buckling up to the critical pressure, with optimum conditions of manufacture, operation and cost. Owing to the overlap and the sheath, there is no need for a closed tube to surround the support and the optical fibres, which would be very expensive and would prevent the cable being flexible. Flexibility is essential, both for an elementary cable used alone and a cable laid with other elementary cables.

According to an advantageous feature, the support of the optical fibres is surrounded by two wound strips, each following the same very short pitch leaving a narrow space, the two strips being wound in the same direction and so as to give a predetermined overlap, the space between each strip preferably coinciding with the longitudinal central line of the other strip and the width of the spaces being considerably less than the width of the strips.

As a rule, the least bulky embodiment is a core formed with cavities containing free optical fibres (one or more fibres per cavity). This reduces the taping radius R and consequently the thickness e of the strips for a given critical pressure.

Owing to the absence of bearing means, braiding and conductors outside the elementary cables, the weight can be reduced by reducing the amount of strips used for taping, thus improving the protection of the optical fibres and preventing any overload and obtaining a cable which is not only self-supporting but can also receive a load with a minimum number of bearing components. The invention can be used to simplify manufacture, reduce cost and obtain a more flexible cable. As a result there is no need for a wound strip for surrounding the assembly supporting the optical fibres, bearing means and conductors, etc., i.e. components which do not need to be protected even against high pressures in the medium containing the cable. Furthermore, since bearing means such as steel or other strands can be separately insulated or protected, there is no need for an expensive sheath surrounding the cable assembly.

For a given number of optical fibres, the optimum number of elementary cables between which the fibres are to be distributed can be determined by following the same principle, inter alia by applying the formula connecting the critical pressure with the thickness and the taping radius and allowing for the conditions under which the fibre supports are manufactured.

The invention will be described in greater detail with reference to the accompanying drawings in which:

FIG. 4 is a sectional view of an embodiment of a cable according to the invention with two helically wound strips;

FIG. 5 is an axial half-section of a cable according to FIG. 4;

FIG. 6 is a front view of a cable according to FIGS. 4 and 5 before the external sheath has been positioned, and FIG. 7 shows a cross-section of another embodiment of a cable according to the invention.

FIG. 1 is a sectional view of a cable having a central part 1 comprising a supporting core and optical fibres (not shown in detail).

Figure 1:
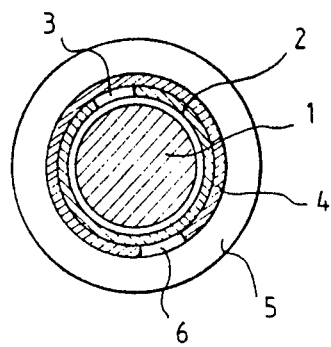
FIG. 1 is a diagrammatic view in cross-section of an elementary cable according to the invention.

The central part 1 is surrounded by a first wound strip 2 leaving a separating space 3 (the width being exagerated in the drawing) between the turns. Strip 2 is surrounded by another strip 4 leaving a space 5 between its edges. Finally, the outside of assembly 1–5 is surrounded by a sealing-tight sheath 6 of synthetic material.

The strips or tapes 2, 4 are helically wound in the same direction around the central part 1. In each case, as in the example in FIG. 2a, strips 2, 4 are offset by a half-width of the tape so that the space 3 between strips 2 is at the centre of the width of strips 4 and similarly the space 5 between the edges of the turns of strip 4 overlaps the middle of the strip 2 underneath.

In general, although the various strips leave a space between their turns, the strip taping is such that the area of cable covered by the strips provides "optical" overlapping greater than 100% of the surface.

It follows from the theory of the resistance of materials, as a first approximation, that when a pressure is externally exerted on a cable constructed in the aforementioned manner (without allowing for sheath 6), the taping 2, 4 begins to buckle on reaching the critical pressure Pc given by the following formula:

$$Pc = \frac{E}{4(1-\mu^2)}\left(\frac{e}{R}\right)^3$$

In this formula:
E = elasticity modulus of the strip material;
$\mu$ = Poisson coefficient of the strip material;
e = thickness of strip;
R = average radius around which the strip is wound and
Pc = critical pressure.

By way of example, in the case of an inner part of a cable about 2.25 mm in diameter with a steel strip 0.1 mm thick, the calculated critical pressure Pc is of the order of 350 bars.

Roughly speaking, the critical pressure Pc depends on the ratio $E/4(1-\mu^2)$, i.e. parameters depending on the material, and is also closely dependent on the ratio of the thickness to the winding radius.

It is therefore advantageous to have a very small winding radius in order not to have to increase the thickness e (for a given critical pressure) and thus increase the weight of the taping material until the load on the cable is prohibitive.

Various embodiments of taping will be described hereinafter with reference to FIGS. 2a–2d. These drawings show only a short length of taping along an axial section of cable (axis xx).

Figure 2A:
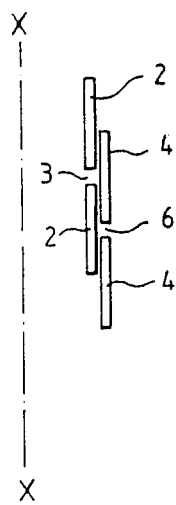
FIGS. 2a, 2b, 2c, 2d are various diagrammatic axial sections of elementary cables according to the invention, showing only the arrangement of the strips.

FIG. 2a shows taping in which the spaces 3, 6 between the edges of the turns of a given tape 2, 4 are on each occasion covered by a turn of the other tape 4, 2.

Figure 2B:
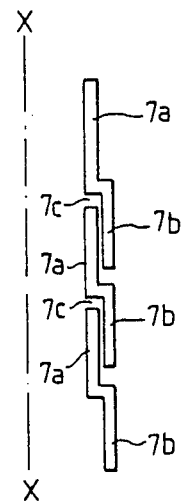

FIG. 2b shows a first kind of overlapping taping; on each occasion strip 7 overlaps by a half 7a, 7b in order to give the appropriate thickness leaving only very narrow gaps 7c with no risk of the sheath creeping through the gaps in a high-pressure environment.

Figure 2C:
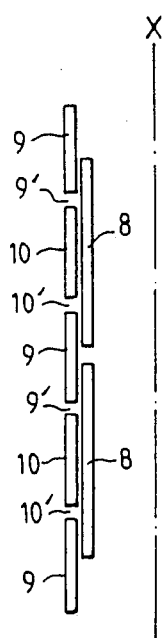

FIG. 2c shows double taping in which the inner tape 8 is wider than the outer tapes 9, 10, the spaces 9', 10' between which are on each occasion opposite a turn of tape 8.

Figure 2D:
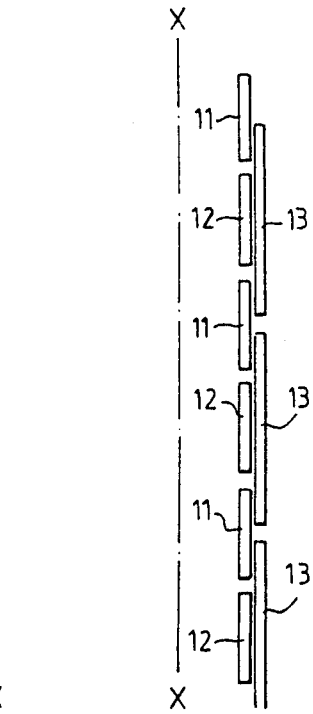

FIG. 2d shows the reverse arrangement from the embodiment in FIG. 2c, i.e. the narrow tapes 11, 12 are disposed inside and covered by the wide tape 13.

Figure 3:
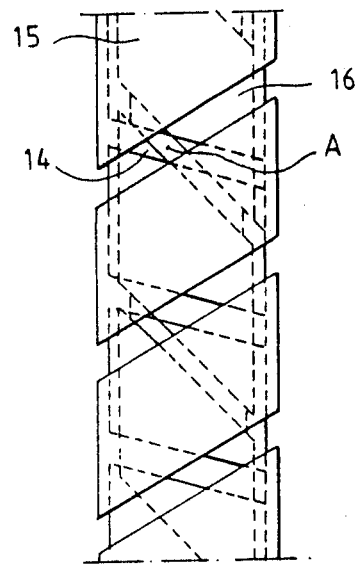
FIG. 3 is a partial front view showing strips wound in opposite directions and, irrespective of their weight, not providing the optical covering required according to the invention.

FIG. 3 shows a cross-section of a cable without a sheath comprising three tapes 14, 15, 16 wound at different, opposite angles and showing a region A which is not covered, i.e. leaves the central part exposed.

FIGS. 4 and 5 are sectional views of an embodiment of a cable according to the invention. In the cable the central part comprises a central member 17 surrounded by a material such as the synthetic material forming the body 18 of the core proper. The central member 17 is adapted to absorb the reaction of the strips during winding. Member 17 is formed with helical cavities 19, 19', 19'', 19''' each containing an optical fibre 20, 20', 20'', 20'''. The cavities are closed by a tape 51 wound round the core body 18. Next, strips 22, 23 are wound in the same direction to ensure that the spaces between the edges of a given helically-wound strip are covered by the central line of another strip as already described (FIGS. 1, 2a). The spaces between strips are denoted by 24 for strip 22 and 25 for strip 23.

In the cross-section (FIG. 5) therefore, the spaces 24, 25 are diametrically opposite since the overlap occurs at the centre of each strip and the strips have the same width.

The resulting assembly is surrounded by a sealing-tight sheath 26. The sheath bears on strips 22, 23 and has only to withstand the resultant of pressure forces except under crushing stress when the cable is subjected to hydrostatic pressure. The strips (i.e. the nature of the material, thickness and density) are also chosen so that when they are subjected to the hydrostatic pressure they do not bear on the core and do not subject it to any force capable of affecting the optical fibers.

The axial section in FIG. 5 shows the arrangement of the cavities in the strips and the sheath. This embodiment comprises a central member 17, which is mainly adapted to absorb the reaction of the strips during winding but is also a bearing component.

FIG. 6 shows a cable according to FIGS. 4 and 5 before the sheath has been positioned.

The previously-described cable can withstand high external pressures. However, the anti-pressure taping is not self-supporting, and consequently the cable is usually combined with bearing components. If the bearing components are placed inside the previously-described cable, its cross-section is increased, with a consequent increase in the length of tape, the weight, the thickness of the tape, etc.

According to an advantageous embodiment of the invention shown in FIG. 7, optical-fibre cables 30, 31 . . . 34 covered with strips are disposed at the centre of a final cable around a central component 35 and are surrounded by one or more layers of bearing components 36, 37 which if required are protected against corrosion by a sheath 38. The "elementary" cables 30, 35 making up the assembly will not be described, since they correspond to previously-described embodiments. The resulting assembly can in turn be surrounded by external braiding 39 and a sheath.

The bearing components are cables extending at small angles to reduce the compression reaction. The components are not adjacent, thus enabling fluid under pressure to penetrate into the cable. Under these conditions, a non-sealing-tight protective covering and supporting component (braiding) is required in order to hold the cable assembly properly during manipulation.

Finally, the respective angles of the bearing elements are chosen to prevent the cable from tending to rotate on itself.

In some applications of the cable, some cavities not holding optical fibres may hold electric conductors which are given the same diameter as the optical fibres in order not to produce incompatibility or internal tensions. The electric conductors may also be disposed in suitably-insulated coaxial layers around the optical components.

Finally, in the case where the central part of the cable, i.e. the part inside the strips, comprises a core formed with cavities receiving free optical fibres, the cavities will advantageously be provided with spaced-apart packing components preventing pressure from being transmitted. The cable is thus divided into longitudinal compartments so that if the sealing-tight sheath is damaged, pressure fluid, inter alia water at very high pressure, cannot penetrate into the sheath and travel along the cavities in the cable. By way of example, the distance between the packing plugs can be of the order of 20 to 40 meters. The small stresses acting on the "free" fibres cause negligible attenuation to the cable assembly.

Alternatively, the cavities can be completely filled by a packing material which leaves the optical fibres free but at least partly prevents external liquid (water) penetrating if the sealing-tight sheath is ruptured.

The electric conductors for supplying electricity and transmitting signals from one end of the cable to the other can either be the components reinforcing the elementary cable cores or can be insulated conductors outside the elementary cables.

EXAMPLE OF A CABLE:

FIG. 7 shows a cable described hereinafter, made up of 20 fibres distributed in five groups of 4 fibres each on a core with a central carrier. The assembly is surrounded by two layers of bearing components.

Optical fibres: Type 50/125 with thin cladding index gradient,
Attenuation: 3.5 dB/km.
Pass-band: 400 mHz.km.
Core: Diameter 2.25 mm.
Central member of core: 7 Invar 0.35 strands.
Depth of cavities: 0.45 mm.
Taping: Two steel strips 0.1 mm thick.
Sheath: Fluorinated synthetic material, diameter 3.8 mm.
Bearing components: A layer of 27 and a layer of 33 components
Carrier: Made up of 7 half cold-worked Invar strands, diameter 0.25.
Protective sheath: Outer diameter of cable: 16.5 mm.
Weight of cable: 535 kg/km (self-supporting in water up to 1500 m).
Payload: 300 kg.
Possible temperature range: −70° to +95° C.
Radius of winding curvature: Above 250 mm.
Attenuation under extreme conditions of load, weight, pressure and temperature: attenuation of fibres varies by less than 0.15 dB/km.

In general, various combinations of elementary cables and bearing or protective components are possible. A central bearing element may or may not be provided depending on circumstances (inter alia depending on the number of elementary cables).

Under the same general conditions, the various kinds of taping shown in FIGS. 2a, 2b, 2c and 2d can be used either separately or superposed, in combination or in different variations for each elementary cable.

We claim:

1. A flexible optical transmission cable adapted for operation under pressure, the cable being made up of at least one elementary cable comprising optical fibers disposed in a circular cylindrical support and surrounded by at least one wound strip having a space between adjacent strip edges in a wound strip layer, and providing more than 100% overlap of said wound strip layer to cover the space between said adjacent strip edges in said wound layer, the strip being in turn surrounded by a sealing-tight sheath and the elementary cable or cables being in turn surrounded by bearing means and mechanical protection means wherein the thickness of the wound strip or strips is related to the winding radius at a given critical pressure or buckling pressure (Pc) by the following formula:

$$Pc = \frac{E}{4(1-\mu^2)} \left(\frac{e}{R}\right)^3$$

in which:
E = elasticity modulus of the strip material,
μ = Poisson coefficient of the strip material,
3 = width of strip and R = average radius around which the outermost strip is wound.

2. A cable according to claim 1, wherein the support of the optical fibers is surrounded by two wound strips, each following a short pitch leaving a space between each strip, the two strips being wound in the same direction and so as to give a predetermined overlap, the space between each strip coinciding with a longitudinal central line of the other strip and a width of the spaces being considerably less than a width of the strips.

3. A cable according to claims 1 or 2, wherein the support of the optical fibers comprises a core having a central bearing means peripherally formed with helical grooves or cavities to receive optical fibers.

4. A cable according to claim 3, wherein each cavity holding an optical fiber contains more than one optical fiber.

5. A cable according to claim 3, wherein the cavities are longitudinally compartmented by packing material.

6. A cable according to claim 3, wherein the cavities are completely filled with a material exerting negligible stress on the fibres and preventing an external fluid from penetrating.

7. A cable according to claims 1 or 2, including electric conducting means comprising cylindrical coaxial layers insulated from one another, the last layer being insulated from the external medium and the conductive layers being made up of covering or braiding or taping means.

8. A cable according to claim 7, wherein those cavities of the core not holding optical fibers receive electric conductors.

9. A cable according to claim 7 wherein the electric conducting means are the taping and/or tensile components and are used for conveying electric signals and/or electric currents.

10. In an optical transmission cable comprising a number of elementary cables disposed around a central component, said number of elementary cables being surrounded by a holding means, the improvement comprising: said optical fibers being surrounded by at least one layer of strip material wound to provide spacing between adjacent edges of said strip material in said layer of strip material, said spacing covered by strip material of another layer, said strip material in said another layer also disposed to provide spacing between adjacent strip material edges in said another layer wherein the thickness of the wound strip or strips is related to the winding radius at a given critical pressure or buckling pressure (Pc) by the following formula:

$$Pc = \frac{E}{4(1 - \mu^2)} \left(\frac{e}{R}\right)^3$$

in which:
E = elasticity modulus of the strip material,
μ = Poisson coefficient of the strip material,
e = width of strip and
R = average radius around which the outermost strip is wound.

11. A flexible optical transmission cable adapted for operation under pressure including at least one elementary cable comprising optical fibers disposed in a cylindrical support and surrounded by at least one wound strip providing more than 100% overlap, the strip being surrounded by a sealing sheath and the elementary cable or cables being surrounded by bearing means and mechanical protection means, wherein the thickness of the wound strip or strips is related to the winding radius at a given critical pressure or buckling pressure (Pc) by the following formula:

$$Pc = \frac{E}{4(1 - \mu^2)} \left(\frac{e}{R}\right)^3$$

in which:
E = elasticity modulus of the strip material,
μ = Poisson coefficient of the strip material,
e = width of strip and
R = average radius around which the outermost strip is wound.

12. The cable of claim 11 wherein said cylindrical support comprises a core having a central bearing means peripherally formed with helical grooves or cavities to receive optical fibers.

13. A flexible optical transmission cable adapted for operation under pressure including at least one cable comprising optical fibers disposed in a cylindrical support and surrounded by at least one wound strip, wherein the thickness of the wound strip or strips is related to the winding radius at a given critical pressure or buckling pressure (Pc) by the following formula:

$$Pc = \frac{E}{4(1 - \mu^2)} \left(\frac{e}{R}\right)^3$$

in which:
E = elasticity modulus of the strip material,
μ = Poisson coefficient of the strip material,
e = width of strip and
R = average radius around which the outermost strip is wound.

* * * * *